United States Patent
Ramachandran et al.

(10) Patent No.: US 9,177,404 B2
(45) Date of Patent: Nov. 3, 2015

(54) SYSTEMS AND METHODS OF MERGING MULTIPLE MAPS FOR COMPUTER VISION BASED TRACKING

(71) Applicant: QUALCOMM Incorporated, San Diego, CA (US)

(72) Inventors: Mahesh Ramachandran, San Diego, CA (US); Abhishek Tyagi, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 13/830,664

(22) Filed: Mar. 14, 2013

(65) Prior Publication Data

US 2014/0119598 A1     May 1, 2014

Related U.S. Application Data

(60) Provisional application No. 61/720,804, filed on Oct. 31, 2012.

(51) Int. Cl.

| | |
|---|---|
| G06K 9/00 | (2006.01) |
| G06T 11/60 | (2006.01) |
| G06K 9/32 | (2006.01) |
| G06K 9/38 | (2006.01) |
| G06T 7/00 | (2006.01) |

(52) U.S. Cl.
CPC ............. *G06T 11/60* (2013.01); *G06K 9/3241* (2013.01); *G06K 9/38* (2013.01); *G06T 7/0071* (2013.01)

(58) Field of Classification Search
None
See application file for complete search history.

(56) References Cited

U.S. PATENT DOCUMENTS

| | | | |
|---|---|---|---|
| 6,366,221 B1 | 4/2002 | Iisaka et al. | |
| 7,756,615 B2 | 7/2010 | Barfoot et al. | |
| 8,018,354 B2 | 9/2011 | Yamamoto | |
| 2009/0190857 A1* | 7/2009 | Epshtein et al. | 382/276 |
| 2009/0310851 A1* | 12/2009 | Arcas et al. | 382/154 |
| 2011/0173565 A1* | 7/2011 | Ofek et al. | 715/790 |
| 2012/0041722 A1* | 2/2012 | Quan | G06T 7/0071 703/1 |
| 2012/0195491 A1 | 8/2012 | Zhang et al. | |
| 2012/0307000 A1* | 12/2012 | Doepke et al. | 348/36 |
| 2013/0009950 A1* | 1/2013 | Ben-David et al. | 345/419 |
| 2013/0293671 A1* | 11/2013 | Gorstan et al. | 348/36 |

FOREIGN PATENT DOCUMENTS

EP     2469234 A2     6/2012

OTHER PUBLICATIONS

Forster C., "Collaborative Structure from Motion", Apr. 1, 2012, pp. i -v, 1-58, XP055096968.

(Continued)

*Primary Examiner* — Bhavesh Mehta
*Assistant Examiner* — Oneal R Mistry
(74) *Attorney, Agent, or Firm* — Silicon Valley Patent Group LLP

(57) ABSTRACT

Method, apparatus, and computer program product for merging multiple maps for computer vision based tracking are disclosed. In one embodiment, a method of merging multiple maps for computer vision based tracking comprises receiving a plurality of maps of a scene in a venue from at least one mobile device, identifying multiple keyframes of the plurality of maps of the scene, and merging the multiple keyframes to generate a global map of the scene.

33 Claims, 9 Drawing Sheets

(56) References Cited

OTHER PUBLICATIONS

International Search Report and Written Opinion—PCT/US2013/063876—ISAEPO—Jan. 29, 2014.

Kim S-H., et al., "Full three-dimensional reconstruction using keyframe selection under circular motion", Optical Engineering, vol. 47, No. 4, Apr. 1, 2008, pp. 1-14, XP040447651.

Neubert J., et al., "Semi-Autonomous Generation of Appearance-based Edge Models from Image Sequences," Sixth IEEE and ACM International Symposium on Mixed and Augmented Reality, Jan. 1, 2008, pp. 1-9, XP040467859.

Klein G., et al., "Parallel Tracking and Mapping on a Camera Phone", Mixed and Augmented Reality 2009, ISMAR 2009, 8th IEEE International Symposium on IEEE, Piscataway, NJ, USA, XP031568942, Oct. 19, 2009, pp. 83-86.

* cited by examiner

SYSTEMS AND METHODS OF MERGING MULTIPLE MAPS FOR COMPUTER VISION BASED TRACKING

CROSS REFERENCE TO RELATED APPLICATIONS

This application claims the benefit of U.S. provisional application No. 61/720,804, "Systems and Methods of Merging Multiple Maps for Computer Vision Based Mobile Device Tracking" filed Oct. 31, 2012. The aforementioned United States application is hereby incorporated by reference in its entirety.

FIELD

The present disclosure relates to the field of wireless communications, computer vision and augmented reality. In particular, the present disclosure relates to systems and methods of merging multiple maps for computer vision based tracking.

BACKGROUND

Numerous conventional methods are available for generating an overall map from multiple sub-maps. These conventional methods store redundant sub-maps in memory for supporting the merge of the multiple sub-maps. Such redundant sub-maps can have low contribution to the quality of the overall map. However, they can consume a significant amount of storage. In addition, valuable computing resources and time may be wasted to process such redundant sub-maps.

SUMMARY

The present disclosure relates to systems and methods of merging multiple maps for computer vision based tracking. In one embodiment, a method of merging multiple maps for computer vision based tracking comprises receiving a plurality of maps of a scene in a venue from at least one mobile device, identifying multiple keyframes of the plurality of maps of the scene, and merging the multiple keyframes to generate a global map of the scene. The method further comprises tracking location of the at least one mobile device in the venue.

The method of receiving a plurality of maps of a scene in a venue comprises receiving the plurality of maps of the scene from multiple mobile devices. The method further comprises evaluating the multiple keyframes from the plurality of maps of the scene from multiple mobile devices for redundancy, and eliminating redundant keyframes. The method further comprises generating a simultaneous localization and mapping (SLAM) map using the plurality of maps of the scene from multiple mobile devices, and sharing the SLAM map among the multiple mobile devices.

The method of identifying multiple keyframes of the plurality of maps of the scene comprises at least one of: identifying the multiple keyframes representing multiple viewpoints of the scene from multiple angles, and identifying the multiple keyframes representing multiple viewpoints of the scene with multiple scales, where the multiple keyframes include common features, location coordinates, and appearances of the plurality of maps. The multiple scales comprise at least one of: multiple distances between the at least one mobile device and the scene, and multiple aspect ratios of the scene from the at least one mobile device.

The method of merging the multiple keyframes to generate a global map of the scene comprises for each keyframe of the multiple keyframes, determining a contribution score based at least in part on angular diversity of the keyframe and scale diversity of the keyframe, and eliminating the keyframe in response to the contribution score being below a predetermined threshold. The method of determining a contribution score based at least in part on angular diversity and scale diversity of the keyframe comprises computing an angular diversity scoring metric by applying a first weight factor to the angular diversity of the keyframe, computing a scale diversity scoring metric by applying a second weight factor to the scale diversity of the keyframe, and combining the angular diversity scoring metric and the scale diversity scoring metric to generate the contribution score.

The method of merging the multiple keyframes to generate a global map of the scene further comprises for each keyframe of the multiple keyframes, determining a contribution score based at least in part on angular diversity of the keyframe, and eliminating the keyframe in response to the contribution score being below a predetermined threshold. The method of merging the multiple keyframes to generate a global map of the scene further comprises for each keyframe of the multiple keyframes, determining a contribution score based at least in part on scale diversity of the keyframe, and eliminating the keyframe in response to the contribution score being below a predetermined threshold.

The method of merging the multiple keyframes to generate a global map of the scene further comprises tallying the multiple keyframes in an angular histogram, where the angular histogram includes a plurality of bins representing different viewing angles of the scene, and each bin in the plurality of bins includes a plurality of sections representing different viewing scales of the scene. The method further includes, for each keyframe of the multiple keyframes in the angular histogram, determining a contribution score based at least in part on angular diversity of the keyframe and scale diversity of the keyframe, and eliminating the keyframe in response to the contribution score being below a predetermined threshold.

The method of determining a contribution score based at least in part on angular diversity and scale diversity of the keyframe comprises computing an angular diversity scoring metric by applying a first weight factor to the angular diversity of the keyframe, where the first weight factor is based at least in part on number of keyframes in a bin the keyframe is in; computing a scale diversity scoring metric by applying a second weight factor to the scale diversity of the keyframe, where the second weight factor is based at least in part on number of keyframes in a section the keyframe is in; and combining the angular diversity scoring metric and the scale diversity scoring metric to generate the contribution score.

In another embodiment, an apparatus comprises logic configured to receive a plurality of maps of a scene in a venue from at least one mobile device, logic configured to identify multiple keyframes of the plurality of maps of the scene, and logic configured to merge the multiple keyframes to generate a global map of the scene.

In yet another embodiment, a computer program product comprises non-transitory medium storing instructions for execution by one or more computer systems. The instructions comprises instructions for receiving a plurality of maps of a scene in a venue from at least one mobile device, instructions for identifying multiple keyframes of the plurality of maps of the scene, and instructions for merging the multiple keyframes to generate a global map of the scene.

In yet another embodiment, a system comprises means for receiving a plurality of maps of a scene in a venue from at least one mobile device, means for identifying multiple keyframes of the plurality of maps of the scene, and means for merging the multiple keyframes to generate a global map of the scene.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

Like numbers are used throughout the figures.

DESCRIPTION OF EMBODIMENTS

Figure 1:
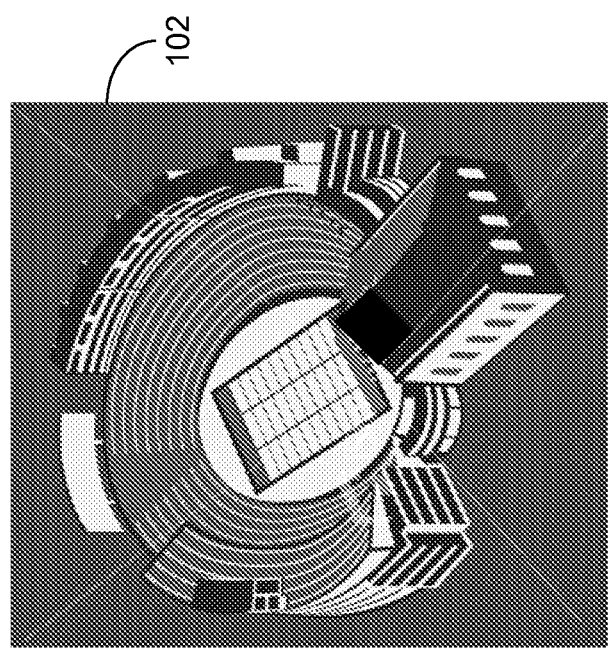
FIG. 1 illustrates an exemplary venue according to some aspects of the present disclosure.

Embodiments of merging multiple maps for computer vision based tracking are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

According to some aspects of the present disclosure, simultaneous localization and mapping (SLAM) based applications build and maintain information about an environment or a venue observed by at least one mobile device to track the location of the at least one mobile device in the environment or the venue. This information includes but is not limited to the structure (3D locations) and appearance of features, which may be also referred to as an environment map. Techniques for map building may be beneficial to support various use cases in different environments or venues. For example, building global maps of a large location using multiple mobile devices may be useful for tracking the locations of the multiple mobile devices in the environment. Note that using multiple mobile devices may be preferred for building a global map as opposed to building a global map using a single mobile device.

In some implementations, these global maps can be shared by multiple mobile devices in the environment in implementing localization. With multiple maps of a scene from different mobile devices, one approach is to merge these maps to obtain a global map. According to aspects of the present disclosure, the global map may be generated in real-time or may be generated offline in a server. Another approach is to remove redundancy while merging multiple maps can lead to a smaller global map size and lower tracking times using the global map. Methods to produce merged maps that represent information about an environment or a venue in an efficient manner are described in the following sections.

According to some aspects of the present disclosure, maps of a scene may be represented as keyframes which are images captured from various viewpoints. Each keyframe may include a set of images and observations of features (location coordinates and appearance of points/lines) of 3D features (points, lines, etc.) in the scene. In some implementations, past observations and keyframes are stored and used to refine the geometry with new incoming observations or constraints. One approach is to store feature observations in the keyframes. Keyframes in a map can capture observations of scene features at diverse viewpoints. In addition, keyframes can provide observations of different parts of the scene with minimal redundancy in the stored information. For feature tracking using appearance, it is useful to have observations of the features from multiple viewpoints as described in association with FIG. 2, and with multiple scales as described in association with FIG. 3 and FIG. 4. Such feature tracking methods are useful for improving tracking quality and robustness.

Note that when merging information between maps, retaining all the keyframes may increase the joint map size if there is redundant information. In addition, it is desirable that pruning (discarding) keyframes may not impact tracking quality since keyframes are critical for tracking performance. In one approach, keyframes viewing features at different angles may be retained, but keyframes viewing features at different scales may be discarded. However this approach does not retain information useful to track features continuously at different distances. It only retains information necessary for performing triangulation or solving for structure. In another approach, keyframes that observe features closer may be preferred. In yet another approach, keyframes that observe features at different distances may be retained, but those observing features at different angles may be discarded. Keyframes are evaluated for their contributions in generating the overall map or image.

Figure 3:
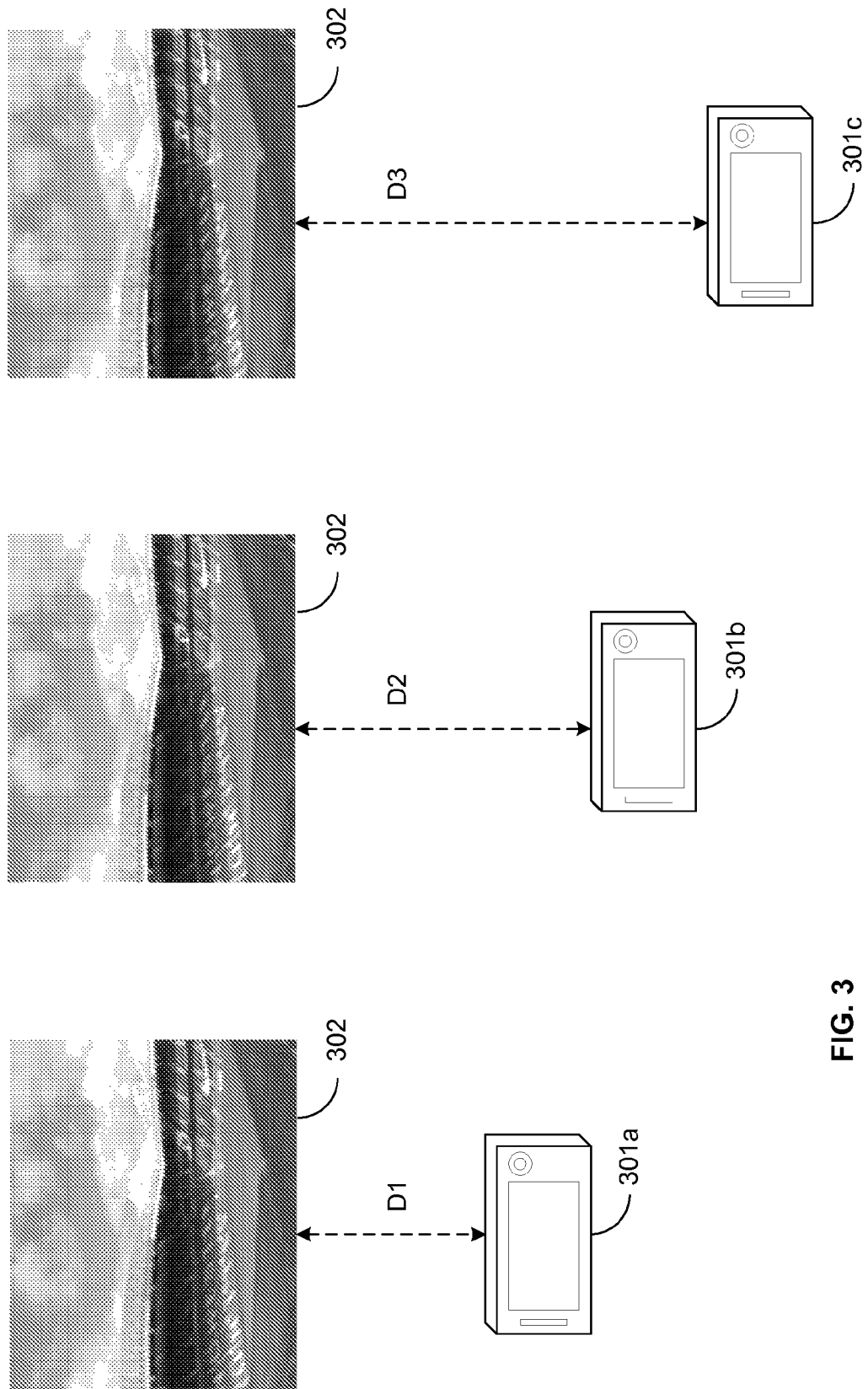
FIG. 3 illustrates a method of capturing multiple viewpoints of a scene from multiple distances according to some aspects of the present disclosure.
Figure 4:
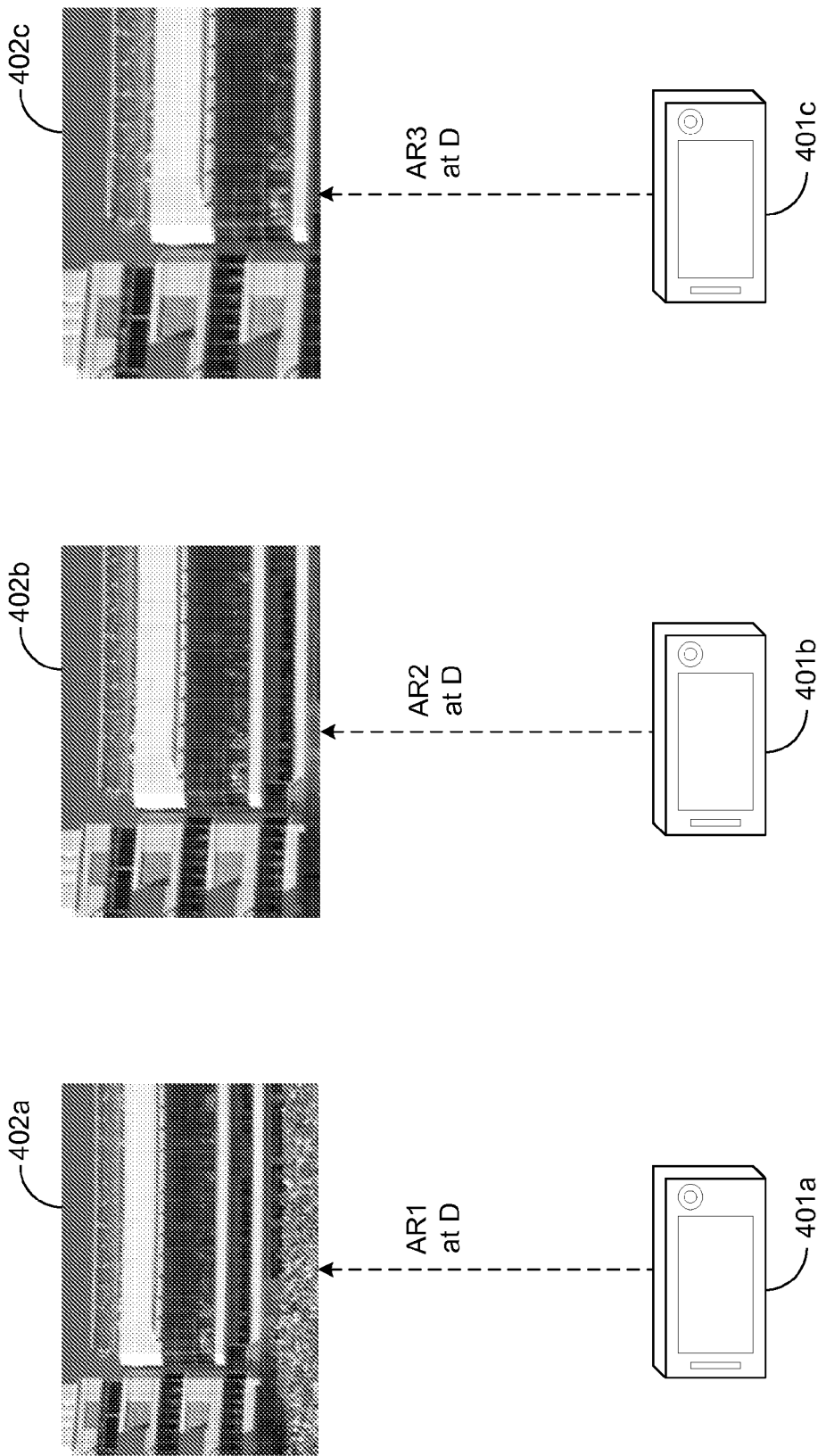
FIG. 4 illustrates a method of capturing multiple viewpoints of a scene with multiple aspect ratios according to some aspects of the present disclosure.

According to aspects of the present disclosure, keyframes that observe features at different scales can be used to capture appearance variations with scale variation as described in association with FIG. 3 and FIG. 4. Moreover, the keyframes can be used to predict appearance from the right scale among the various scales, such that the predicted appearance has minimal artifacts or appearance distortions.

In one exemplary implementation, a contribution score associated with a keyframe can be determined based at least in part on angular diversity and scale diversity of the keyframe. For example, one part of the contribution score can be derived from the keyframe's contribution to angular diversity for the features observed by the keyframe. Another part of the contribution score can be derived from the keyframe's contribution to scale diversity for the features observed by the keyframe. Then, the keyframe may be eliminated if the contribution score is below a predetermined threshold. According to aspects of the present disclosure, the predetermined threshold for the contribution score may be programmable depending on the application. In some other implementations, the contribution score may represent the number of keyframes already exist in a bin configured to tally the occurrence of number of keyframes from certain viewing angle and from certain viewing scale or distance. In some applications, the predetermined threshold for the number of keyframes in a bin may be set to 2, and in some other applications, the predetermined threshold for the number of keyframes in a bin may be set to 5, for example.

In other words, a keyframe scoring method can use a first scoring metric to measure angular diversity and use a second scoring metric to measure scale diversity of the keyframe. The two metrics may then be combined with different weight factors and summed. The weight factors can be used to place more emphasis on one scoring metric versus the other scoring metric. According to aspects of the present disclosure, the weight factors for the angular diversity and scale diversity may be programmable and their range may vary from 0 (0%) to 1 (100%). For example, in some implementations, the weight of the angular diversity may be 0 and the weight of the scale diversity may be 1, or vice versa. In some other implementations, the weight of the angular diversity may be 0.5 and the weight of the scale diversity may be 0.5. In yet some other implementations, the weight of the angular diversity may be 0.6 and the weight of the scale diversity may be 0.4, and so on. The joint metric can then be used to evaluate the contribution of the keyframe for mapping and tracking. As described above, a keyframe may be eliminated (or pruned) if its contribution score is below a predetermined threshold. For example, if there were nine other keyframes that look at the same object in the scene from very similar distance and angle, these nine keyframes would have low angle and scale diversity scores because removing any one of them does not matter since the other keyframes have the same information content In another exemplary implementation, in determining angular diversity metric of a scene, information content of each observation of the scene may be computed. The normalized score may then be accumulated to form the contribution score of the keyframe. Note that this approach encourages angular diversity but prefers keyframes that represent scenes having corresponding distances closer to the mobile device.

In determining scale diversity metric of a scene, a measure of scale diversity is used. The method may be configured to use a keyframe at a distance x to synthesize views from distances of 0.5× to 2× as an example, which corresponds to down-sampling/up-sampling by one pyramid level. In this approach, for all keyframes that fall in this bracket, the method assigns a contribution score which may be one divided by number of keyframes (N) in that bracket. It then sums up the contribution scores from the map points being observed. According to aspects of the present disclosure, various approaches may be used to assign scores based on scale diversity, for example one approach may use: −0.25*N+ 1.5 if N<=5, 1/N if N>5.

FIG. 1 illustrates an exemplary venue according to some aspects of the present disclosure. As shown in FIG. 1, the exemplary venue 102 may be a complex football stadium. For such a complex venue, a typical mobile device may not be able to capture an image representative of the whole stadium. It is desirable to merge multiple images captured by one or more mobile devices to construction a global image that can be used in tracking and positioning applications.

Figure 2:
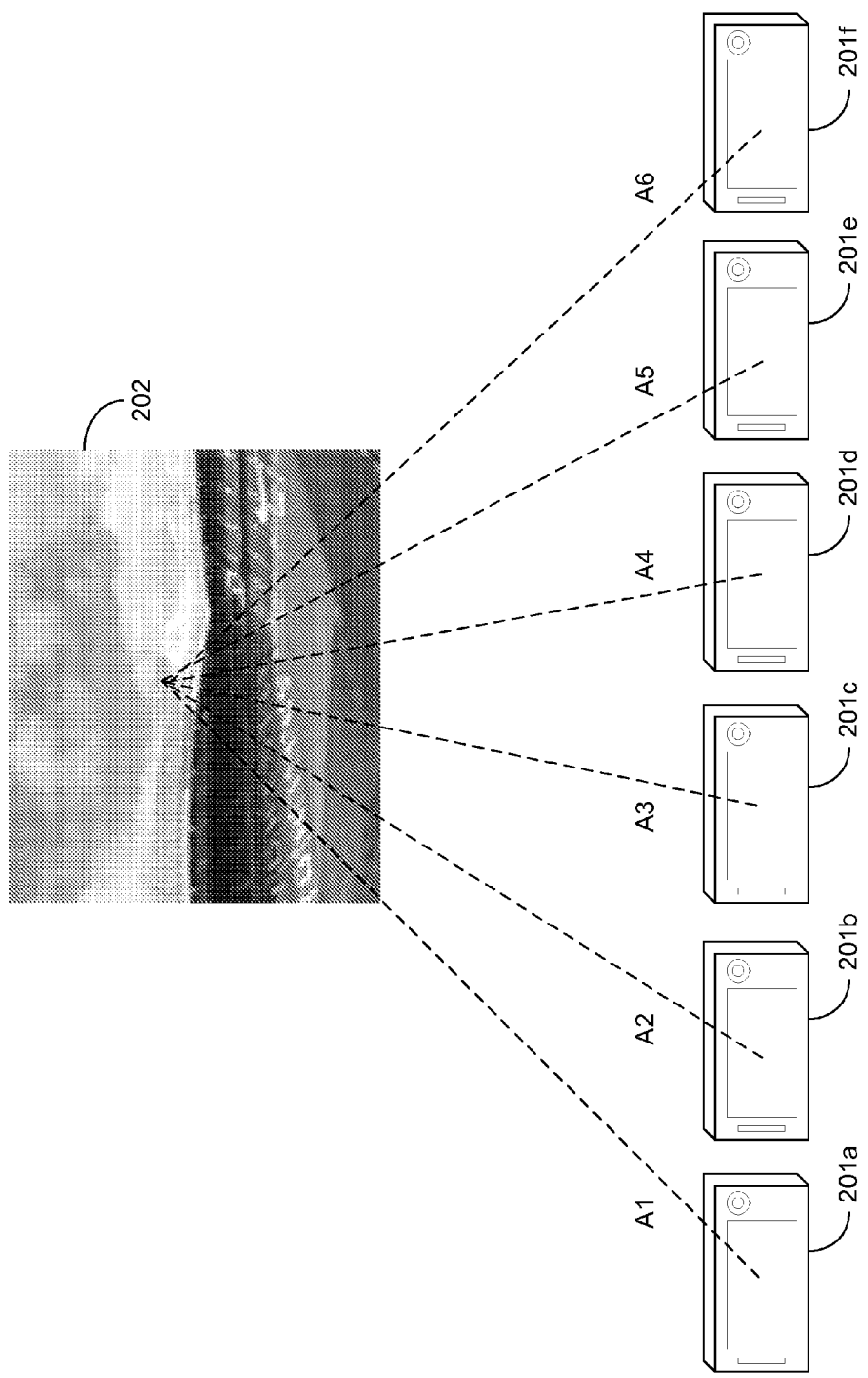
FIG. 2 illustrates a method of capturing multiple viewpoints of a scene from multiple angles according to some aspects of the present disclosure.

FIG. 2 illustrates a method of capturing multiple viewpoints of a scene from multiple angles according to some aspects of the present disclosure. In the example shown in FIG. 2, a scene 202 may be captured by one or more mobile devices (201a through 201f) at different viewing angles. For example, mobile device 201a has a viewing angle A1, mobile device 201b has a viewing angle A2 . . . and mobile device 201f has a viewing angle A6. In some implementations, the multiple viewpoints (A1 through A6) may be captured by one mobile device. In some other implementations, the multiple viewpoints (A1 through A6) may be captured by multiple mobile devices.

FIG. 3 illustrates a method of capturing multiple viewpoints of a scene from multiple distances according to some aspects of the present disclosure. In the example shown in FIG. 3, a scene 302 may be captured by one or more mobile devices (301a through 301c) from different distances. For example, mobile device 301a captures the scene 302 at distance D1, mobile device 301b captures the scene 302 at distance D2, and mobile device 301c captures the scene 302 at distance D3. In some implementations, the multiple viewpoints from different distances (D1 through D3) may be captured by one mobile device. In some other implementations, the multiple viewpoints from different distances (D1 through D3) may be captured by multiple mobile devices.

FIG. 4 illustrates a method of capturing multiple viewpoints of a scene with multiple aspect ratios according to some aspects of the present disclosure. In the example shown in FIG. 4, multiple viewpoints of a scene 402 may be captured by one or more mobile devices (401a through 401c) with different aspect ratio settings of the one or more mobile devices. For example, mobile device 401a captures the scene 402 with aspect ratio AR1 at distance D, mobile device 401b captures the scene 402 with aspect ratio AR2 at distance D, and mobile device 401c captures the scene 402 with aspect ratio AR3 at distance D. In some implementations, the multiple viewpoints of the scene 402 with different aspect ratios (AR1 through AR3) may be captured by one mobile device. In some other implementations, the multiple viewpoints of the scene 402 with different aspect ratios (AR1 through AR3) may be captured by multiple mobile devices.

Figure 5:
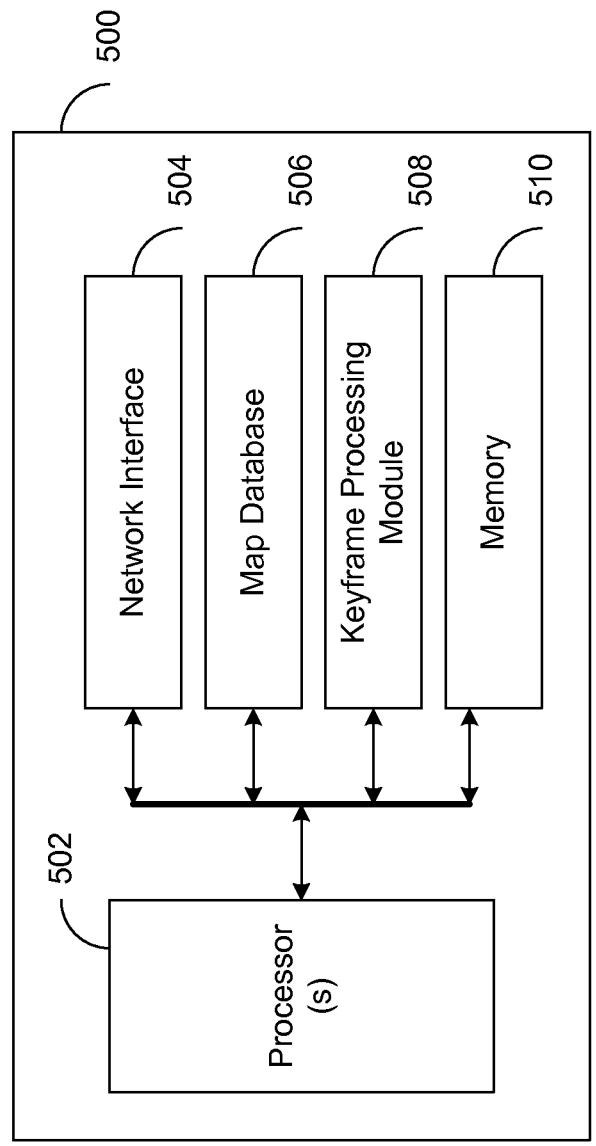
FIG. 5 illustrates an exemplary apparatus for implementing the method of merging multiple maps for computer vision based tracking according to some aspects of the present disclosure.

FIG. 5 illustrates an exemplary apparatus for implementing the method of merging multiple maps for computer vision based tracking according to some aspects of the present disclosure. In the example shown in FIG. 5, apparatus 500 includes one or more processors 502, network interface 504, map database 506, keyframe processing module 508, and memory 510. The one or more processors 502 can be configured to control operations of the apparatus 500. The network interface 504 can be configured to communicate with a network (not shown), which may be configured to communicate with servers, computers, and mobile devices on the network. The map database 506 can be configured to store images of different venues, landmarks, maps, and other user-defined information. The keyframe processing module 538 can be configured to implement methods of merging multiple maps for computer vision based tracking. For example, working with the processor(s) 502, the keyframe processing module 508 can be configured to implement methods described above and methods described below in association with FIG. 6, FIG. 8 and FIG. 9. The memory 510 can be configured to store program codes and data for the apparatus 500. Note that in other embodiments, the methods described below in association with FIG. 6, FIG. 8 and FIG. 9 may be implemented by one of the mobile devices as shown in FIG. 2, FIG. 3 and FIG. 4 as well as being implemented by a server.

Figure 6:
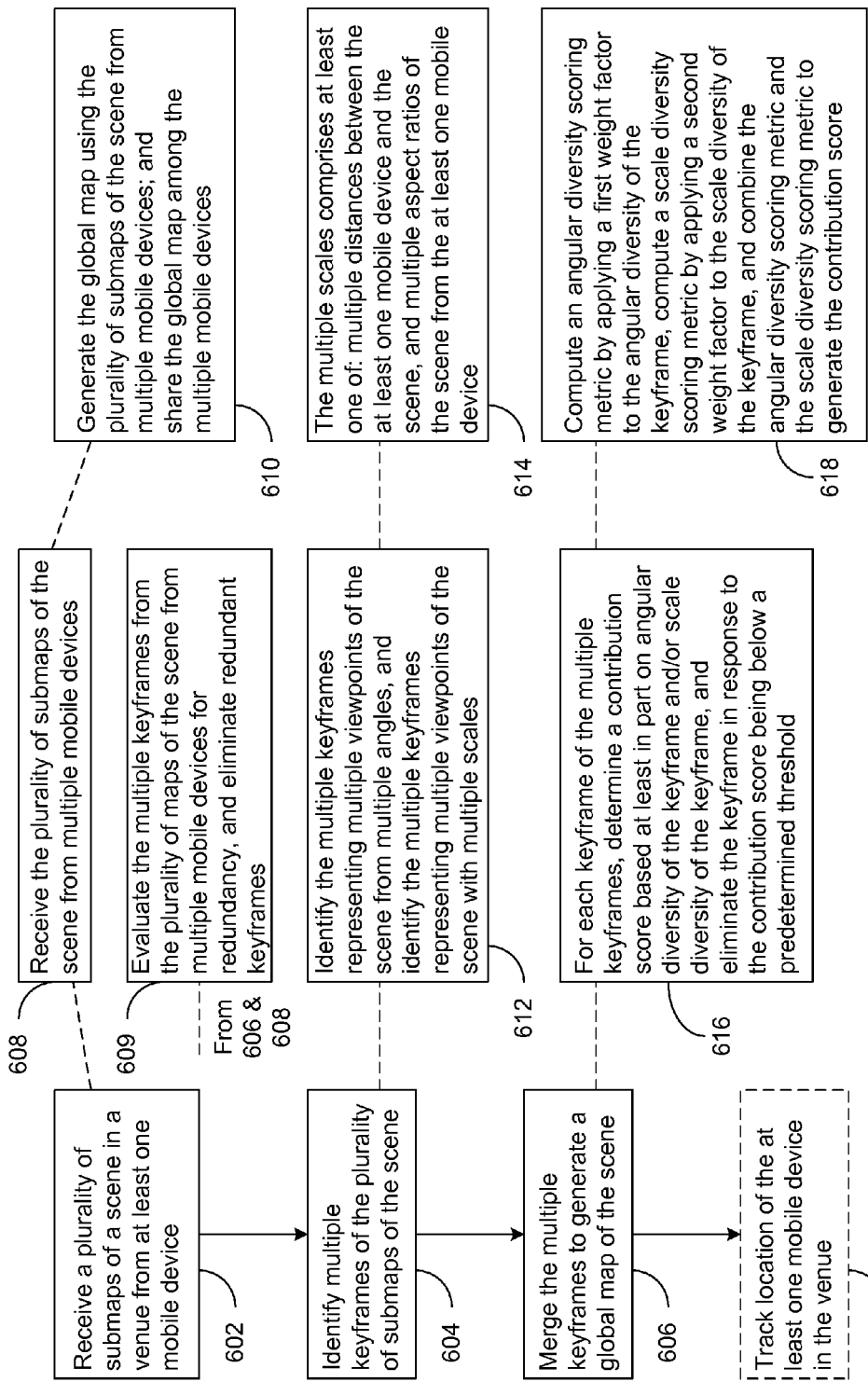
FIG. 6 illustrates an exemplary flow chart for implementing a method of merging multiple maps for computer vision based tracking according to some aspects of the present disclosure.

FIG. 6 illustrates an exemplary flow chart for implementing a method of merging multiple maps for computer vision based tracking according to some aspects of the present disclosure. In the exemplary implementation shown in FIG. 6, in block 602, the method receives a plurality of maps of a scene in a venue from at least one mobile device. In block 604, the method identifies multiple keyframes of the plurality of maps of the scene. In block 606, the method merges the multiple keyframes to generate a global map of the scene. According to aspects of the present disclosure, the global map may include but not limited to three-dimensional models, simultaneous localization and mapping (SLAM) maps, and two-dimensional models of the venue. In additional, the global may be updated dynamically or may be updated offline in a remote server. Note that in some situations, none of the plurality of maps may overlap each other; and in such situations none of the corresponding keyframes in the plurality of maps may be removed because these keyframes may be deemed to have high angular and/or scale diversity relative to their respective one or more nearby keyframes. In some other situations, some of the plurality of maps may overlap each other; and in such situations some of the corresponding keyframes in the plurality of maps may be removed because some of the redundant keyframes may be deemed to have low angular and/or scale diversity relative to their respective one or more nearby keyframes. In some special situations, two or more maps may substantially overlap each other; and in such situations most of the corresponding keyframes from at least one of the maps may be removed because most of the redundant keyframes may be deemed to have low angular and/or scale diversity relative to their respective one or more nearby keyframes.

According to some aspects of the present disclosure, the methods performed in block 602 may further include methods performed in block 608, and the methods performed in block 608 may further include method performed in blocks 609 and 610. In block 608, the method receives the plurality of maps of the scene from multiple mobile devices. In block 609, the method evaluates the multiple keyframes from the plurality of maps of the scene from multiple mobile devices for redundancy, and eliminates redundant keyframes. In block 610, the method generates the global map using the plurality of maps of the scene from multiple mobile devices, and shares the global map among the multiple mobile devices.

According to some aspects of the present disclosure, the methods performed in block 604 may further include methods performed in block 612, and the methods performed in block 612 may further include elements of block 614. In block 612, the method identifies the multiple keyframes representing multiple viewpoints of the scene from multiple angles, and/or identifies the multiple keyframes representing multiple viewpoints of the scene with multiple scales, where the multiple keyframes include features, three dimensional coordinates, and appearances of the plurality of maps. In block 614, the multiple scales comprise at least one of: multiple distances between the at least one mobile device and the scene, and multiple aspect ratios of the scene from the at least one mobile device.

According to some aspects of the present disclosure, the methods performed in block 606 may further include methods performed in block 616, and the methods performed in block 616 may further include the methods performed in block 618. In block 616, for each keyframe of the multiple keyframes, the method determines a contribution score based at least in part on angular diversity of the keyframe and/or scale diversity of the keyframe, and eliminates the keyframe in response to the contribution score being below a predetermined threshold. In block 618, the method computes an angular diversity scoring metric by applying a first weight factor to the angular diversity of the keyframe, computes a scale diversity scoring metric by applying a second weight factor to the scale diversity of the keyframe, and combines the angular diversity scoring metric and the scale diversity scoring metric to generate the contribution score. In block 620, the method may optionally track location of the at least one mobile device in the venue.

Figure 7:
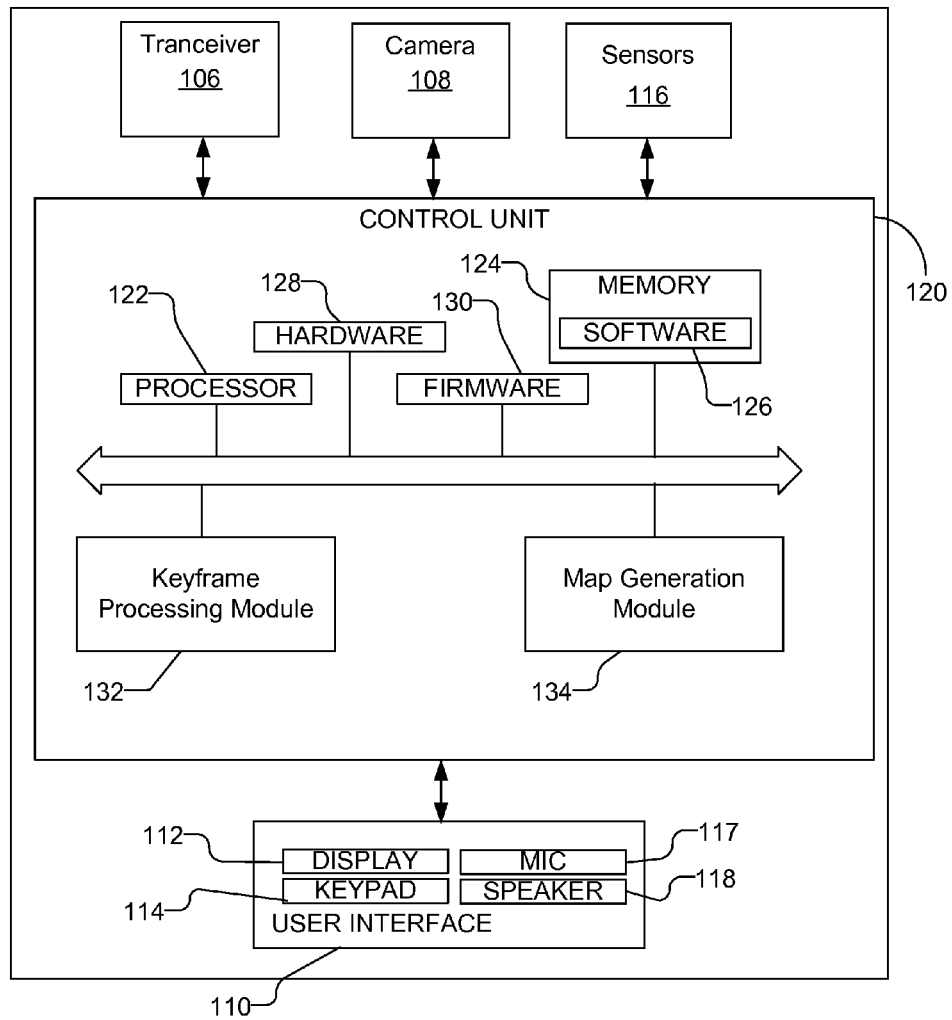
FIG. 7 illustrates an exemplary block diagram of a mobile device according to some aspects of the present disclosure.

FIG. 7 illustrates an exemplary block diagram of a mobile device according to some aspects of the present disclosure. The mobile device 201 (may be configured to implement 201a to 201f) includes a transceiver 106 for communicating with other computing devices including but not limited to servers and other mobile devices, a camera 108 for capturing images of the environment, which may be either individual photos or frames of video. The mobile device 201 may also include sensors 116, which may be used to provide data with which the mobile device 201 can determine its position and orientation, i.e., pose. Examples of sensors that may be used with the mobile device 201 include accelerometers, quartz sensors, gyros, micro-electromechanical system (MEMS) sensors used as linear accelerometers, as well as magnetometers.

The mobile device 201 may also include a user interface 110 that includes display 112 capable of displaying images. The user interface 110 may also include a keypad 114 or other input device through which the user can input information into the mobile device 201. If desired, the keypad 114 may be obviated by integrating a virtual keypad into the display 112 with a touch sensor. The user interface 110 may also include a microphone 117 and one or more speakers 118, for example, if the mobile platform is a cellular telephone. Of course, mobile device 201 may include other components unrelated to the present disclosure.

The mobile device 201 further includes a control unit 120 that is connected to and communicates with the camera 108 and sensors 116, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a keyframe processing module 132 configured to process keyframes based on observations captured by the mobile device 201. The control unit 120 further includes a map generation module 134 configured to generate a map based on a plurality of submaps. The keyframe processing module 132 and map generation module 134 are illustrated separately from processor 122 and/or hardware 128 for clarity, but may be combined and/or implemented in the processor 122 and/or hardware 128 based on instructions in the software 126 and the firmware 130. Note that control unit 120 can be configured to implement methods of keyframe processing and map generation. For example, the control unit 120 can be configured to implement functions of the mobile device 201 described in FIG. 2, FIG. 3 and FIG. 4.

Figure 8:
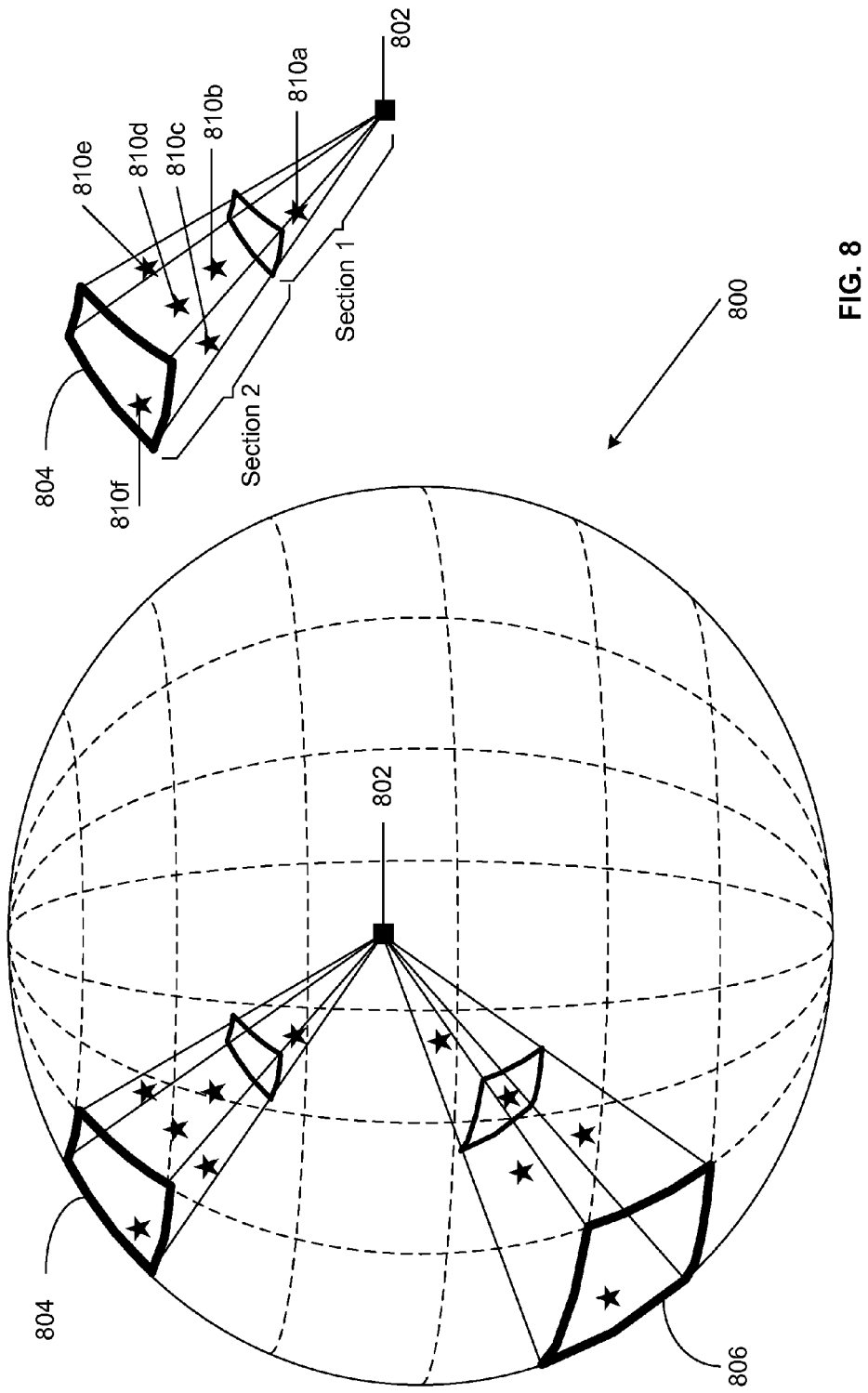
FIG. 8 illustrates an exemplary method for determining angular and scale diversities of keyframes according to some aspects of the present disclosure.

FIG. 8 illustrates an exemplary method for determining angular and scale diversities of keyframes according to some aspects of the present disclosure. As shown in FIG. 8, an object 802, shown as a black square, may be observed from different angles, different distances and with different scales. In one approach, possible directions may be discretized into bins of a sphere 800, such as 804 and 806 shown in FIG. 8. According to aspects of the present disclosure, a bin may represent a sector (which is shown as approximately a pyramid) of the sphere 800. A bin may also be considered as an angular histogram that records keyframes that include observations, which are represented by one or more stars in the bin. For illustration purposes, bin 804 is shown separately on the right side of the sphere 800. In this example, bin 804 may include observations 810*a*, 810*b*, 810*c*, 810*d*, 810*e*, and 810*f*. In some implementations, a bin may be further partitioned into multiple sections, such as Section 1 and Section 2 shown in FIG. 8. Each observation within a bin may be evaluated against other observations within the sector, or may be evaluated against other observations from other bins.

In some implementations, if the number of observations (of a mappoint) in a bin is less than a predetermined number, for example 3, the observations may be considered having high angular importance and the observations may be retained. On the other hand, if the number of observations is larger than the predetermined number, then an additional observation may be considered having low angular importance, and the additional observation may be discarded.

According to aspects of the present disclosure, given an observation of a mappoint from a viewpoint, its appearance from a different viewpoint and similar looking angle may be expected to be accurately generated within 1/f to f times the distance of the camera to the mappoint. In some implementations, f may be equal to 2; and in other implementations, the value of f can be lower depending on how much scale coverage is desired. A log of a distance of camera to a mappoint for each observation may be assigned to a bin, which represents an angular histogram of the observations. The distance may be recorded in linear scale or in log scale.

In some implementations, if the number of observations in a bin is less than a predetermined number, for example 2, the observations may be considered having high scale importance, and such observations may be retained. On the other hand, if the number of observations in a bin is more than the predetermined number, then an additional observation in the bin may be considered having low scale importance, and the additional observation may be discarded.

According to aspects of the present disclosure, if an observation has high angular or scalar importance, then it may be flagged as important. If an observation has low angular and low scalar importance, it may be flagged as unimportant, and it may be removable. If a keyframe has greater than a predetermined fraction (for example 0.8) of removable observations and less than a predetermined fraction (for example 0.1) of important observations, it may be flagged for removal.

Figure 9:
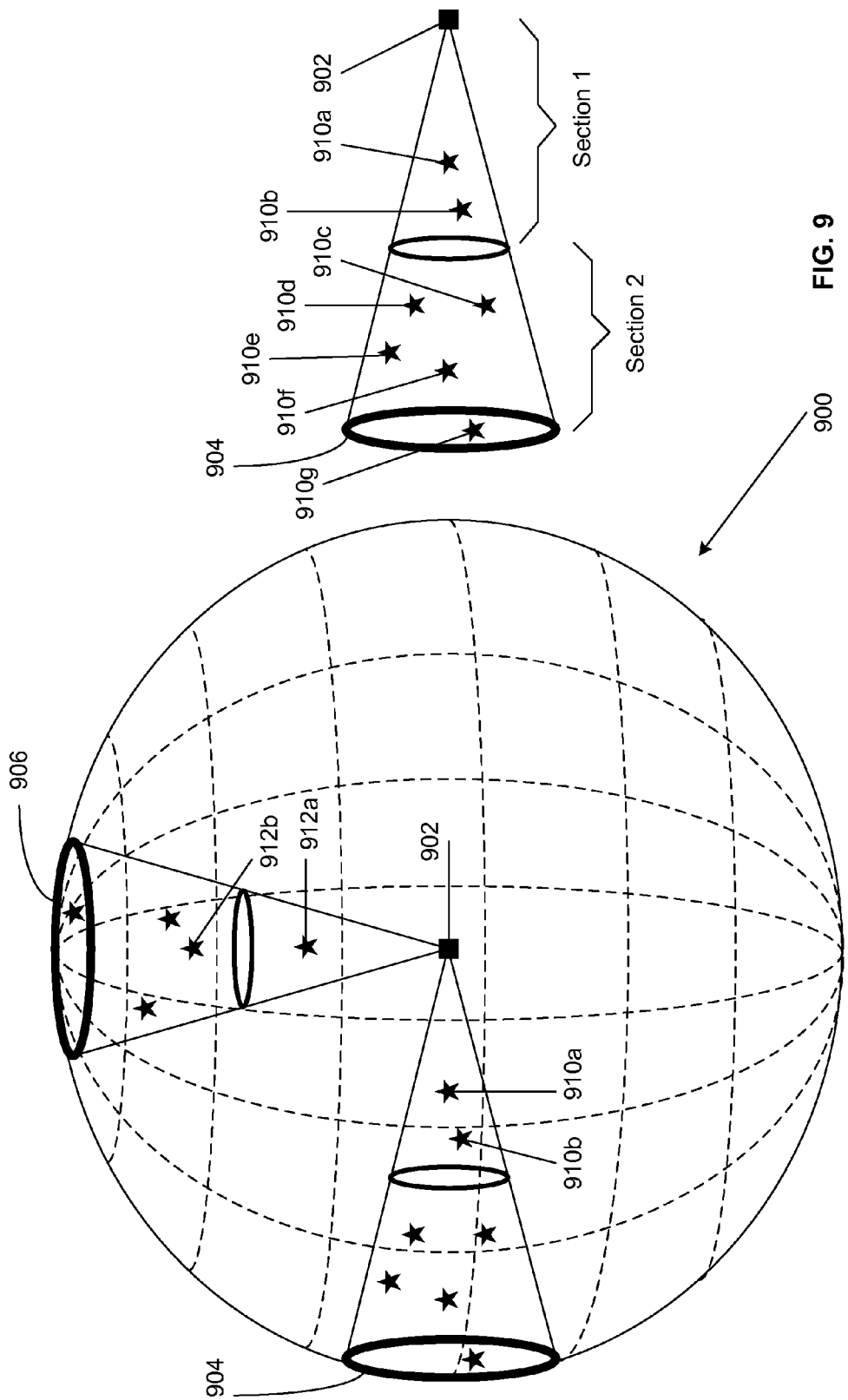
FIG. 9 illustrates another exemplary method for determining angular and scale diversity of keyframes according to some aspects of the present disclosure.

FIG. 9 illustrates another exemplary method for determining angular and scale diversity of keyframes according to some aspects of the present disclosure. In the example shown in FIG. 9, an object 902, shown as a black square, may be observed from different angles, different distances and with different scales. In one approach, possible directions may be discretized into bins of a sphere 900, such as 904 and 906 shown in FIG. 9. Similar to the example shown in FIG. 8, a bin may represent a sector (which is shown as a cone) of the sphere 900. A bin may also be considered as an angular histogram that records keyframes that include observations, which are represented by one or more stars in the bin. For illustration purposes, bin 904 is shown separately on the right side of the sphere 900. In this example, bin 904 may include observations 910*a*, 910*b*, 910*c*, 910*d*, 910*e*, 910*f*, and 910*g*. In some implementations, a bin may be further partitioned into multiple sections, such as Section 1 and Section 2 as shown in FIG. 9. Each observation within a bin may be evaluated against other observations within the sector, or may be evaluated against other observations from other bins.

According to aspects of the present disclosure, assuming a first observation already exists in a first bin, having a second observation in a second bin would contribute a higher angular diversity (i.e. importance) than having the second observation in the first bin. For example, if observation 910*a* already exists in bin 904, having observation 912*a* in the bin 906 would contribute a higher angular diversity than having observation 910*b* in bin 904. In some implementations, contribution of angular diversity by an additional observation to a bin may be inversely proportional to the number of observations in the bin.

According to aspects of the present disclosure, assuming an observation already exists in a first section of a bin, having an additional observation in a second section of the bin would contribute a higher scale diversity (i.e. importance) than having the additional observation in the first section. For example, if observation 910*a* already exists in section 1 of bin 904, having additional observation 910*f* in section 2 of bin 904 would contribute a higher scale diversity than having observation 910*b* in section 1 of bin 904. In some implementations, contribution of scale diversity by an additional observation in a section of a bin may be inversely proportional to the number of observation in the section of the bin.

According to aspects of the present disclosure, identifying and tracking features in image frames may be performed using a number of techniques. In one approach, a method of identifying features may be performed by examining the minimum eigenvalue of each 2 by 2 gradient matrix. Then the features are tracked using a Newton-Raphson method of minimizing the difference between the two windows. The method of multi-resolution tracking allows for relatively large displacements between images. Note that during tracking of features from one frame to the next frame, errors may accumulate. To detect potentially bad features, the mobile device may be configured to monitor whether the image signal in the window around the feature in the current frame is still similar to the image signal around the feature in the previous frame. Since features may be tracked over many frames, the image content may be deformed. To address this issue, consistency check may be performed with a similarity or an affine mapping.

According to aspects of the present disclosure, to identify an object in an image, points on the object may be extracted to provide feature descriptions (also referred to as keypoints, feature points or features for short) of the object. This description, extracted from a training image, may then be used to identify the object when attempting to locate the object in a test image containing many other objects. To perform reliable recognition, the features extracted from the training image may be detectable even under changes in image scale, noise and illumination. Such points usually lie on high-contrast regions of the image, such as object edges.

Another characteristic of these features is that the relative positions between them in the original scene may not change from one image to another. For example, if only the four corners of a door are used as features, they may work regardless of the door's position; but if points in the frame are used, the recognition may fail if the door is opened or closed. Similarly, features located in articulated or flexible objects may typically not work if any change in their internal geometry happens between two images in the set being processed. In some implementations, SIFT detects and uses a larger number of features from the images, which can reduce the contribution of the errors caused by the local variations in the average error of all feature matching errors. Thus, the disclosed method may identify objects even among clutter and under partial occlusion; because the SIFT feature descriptor can be invariant to uniform scaling, orientation, and partially invariant to affine distortion and illumination changes.

For example, keypoints of an object may first be extracted from a set of reference images and stored in a database. An object is recognized in a new image by comparing each feature from the new image to this database and finding candidate matching features based on Euclidean distance of their feature vectors. From the full set of matches, subsets of keypoints that agree on the object and its location, scale, and orientation in the new image may be identified to filter out good matches. The determination of consistent clusters may be performed by using a hash table implementation of a generalized Hough transform. Each cluster of 3 or more features that agree on an object and its pose may then be subject to further detailed model verification and subsequently outliers may be discarded. The probability that a particular set of features indicates the presence of an object may then be computed based on the accuracy of fit and number of probable false matches. Object matches that pass the tests can be identified as correct with high confidence.

According to aspects of the present disclosure, image feature generation transforms an image into a large collection of feature vectors, each of which may be invariant to image translation, scaling, and rotation, as well as invariant to illumination changes and robust to local geometric distortion. These features share similar properties with neurons in inferior temporal cortex that are used for object recognition in primate vision. Key locations may be defined as maxima and minima of the result of difference of Gaussians function applied in scale space to a series of smoothed and resampled images. Low contrast candidate points and edge response points along an edge may be discarded. Dominant orientations are assigned to localized keypoints. This approach ensures that the keypoints are more stable for matching and recognition. SIFT descriptors robust to local affine distortion may then be obtained by considering pixels around a radius of the key location, blurring and resampling of local image orientation planes.

Features matching and indexing may include storing SIFT keys and identifying matching keys from the new image. In one approach, a modification of the k-d tree algorithm which is also referred to as the best-bin-first search method that may be used to identify the nearest neighbors with high probability using a limited amount of computation. The best-bin-first algorithm uses a modified search ordering for the k-d tree algorithm so that bins in feature space may be searched in the order of their closest distance from the query location. This search order requires the use of a heap-based priority queue for efficient determination of the search order. The best candidate match for each keypoint may be found by identifying its nearest neighbor in the database of keypoints from training images. The nearest neighbors can be defined as the keypoints with minimum Euclidean distance from the given descriptor vector. The probability that a match is correct can be determined by taking the ratio of distance from the closest neighbor to the distance of the second closest.

In one exemplary implementation, matches in which the distance ratio is greater than 0.8 may be rejected, which eliminates 90% of the false matches while discarding less than 5% of the correct matches. To further improve the efficiency of the best-bin-first algorithm, search may be cut off after checking a predetermined number (for example 100) nearest neighbor candidates. For a database of 100,000 keypoints, this may provide a speedup over exact nearest neighbor search by about 2 orders of magnitude, yet results in less than a 5% loss in the number of correct matches.

Note that with the exemplary implementation, the Hough Transform may be used to cluster reliable model hypotheses to search for keys that agree upon a particular model pose. Hough transform may be used to identify clusters of features with a consistent interpretation by using each feature to vote for object poses that may be consistent with the feature. When clusters of features are found to vote for the same pose of an object, the probability of the interpretation being correct may be higher than for any single feature. An entry in a hash table may be created to predict the model location, orientation, and scale from the match hypothesis. The hash table can be searched to identify clusters of at least 3 entries in a bin, and the bins may be sorted into decreasing order of size.

According to aspects of the present disclosure, each of the SIFT keypoints may specify 2D location, scale, and orientation. In addition, each matched keypoint in the database may have a record of its parameters relative to the training image in which it is found. The similarity transform implied by these 4 parameters may be an approximation to the 6 degree-of-freedom pose space for a 3D object and also does not account for any non-rigid deformations. Therefore, an exemplary implementation may use broad bin sizes of 30 degrees for orientation, a factor of 2 for scale, and 0.25 times the maximum projected training image dimension (using the predicted scale) for location. The SIFT key samples generated at the larger scale may be given twice the weight of those at the smaller scale. With this approach, the larger scale may in effect able to filter the most likely neighbors for checking at the smaller scale. This approach also improves recognition performance by giving more weight to the least-noisy scale. According to aspects of the present disclosure, to avoid the issue of boundary effects in bin assignment, each keypoint match may vote for the 2 closest bins in each dimension, giving a total of 16 entries for each hypothesis and further broadening the pose range.

According to aspects of the present disclosure, outliers may be removed by checking for agreement between each image feature and the model, for a given parameter solution. For example, given a linear least squares solution, each match may be required to agree within half the error range that is used for the parameters in the Hough transform bins. As outliers are discarded, the linear least squares solution may be resolved with the remaining points, and the process may be iterated. In some implementations, if less than a predetermined number of points (e.g. 3 points) remain after discarding outliers, the match may be rejected. In addition, a top-down matching phase may be used to add any further matches that agree with the projected model position, which may have been missed from the Hough transform bin due to the similarity transform approximation or other errors.

The decision to accept or reject a model hypothesis can be based on a detailed probabilistic model. The method first computes an expected number of false matches to the model pose, given the projected size of the model, the number of features within the region, and the accuracy of the fit. A Bayesian probability analysis can then give the probability that the object may be present based on the actual number of matching features found. A model may be accepted if the final probability for a correct interpretation is greater than a predetermined percentage (for example 95%).

According to aspects of the present disclosure, in one approach, rotation invariant feature transform (RIFT) method may be employed as a rotation-invariant generalization of SIFT to address under clutter or partial occlusion situations. The RIFT descriptor may be constructed using circular normalized patches divided into concentric rings of equal width and within each ring a gradient orientation histogram may be computed. To maintain rotation invariance, the orientation may be measured at each point relative to the direction pointing outward from the center.

In another approach, a generalized robust invariant feature (G-RIF) method may be used. The G-RIF encodes edge orientation, edge density and hue information in a unified form combining perceptual information with spatial encoding. The object recognition scheme uses neighboring context based voting to estimate object models.

In yet another approach, a speeded up robust feature (SURF) method may be used which uses a scale and rotation-invariant interest point detector/descriptor that can outperform previously proposed schemes with respect to repeatability, distinctiveness, and robustness. SURF relies on integral images for image convolutions to reduce computation time, and builds on the strengths of the leading existing detectors and descriptors (using a fast Hessian matrix-based measure for the detector and a distribution-based descriptor). The SURF method describes a distribution of Haar wavelet responses within the interest point neighborhood. Integral images may be used for speed, and 64 dimensions may be used to reduce the time for feature computation and matching. The indexing step may be based on the sign of the Laplacian, which increases the matching speed and the robustness of the descriptor.

In yet another approach, the principle component analysis SIFT (PCA-SIFT) method may be used. In some implementations, the PCA-SIFT descriptor is a vector of image gradients in x and y direction computed within the support region. The gradient region can be sampled at 39×39 locations. Thus, the vector can be of dimension 3042. The dimension can be reduced to 36 with PCA. In yet another approach, the Gradient location-orientation histogram (GLOH) method can be employed, which is an extension of the SIFT descriptor designed to increase its robustness and distinctiveness. In some implementations, the SIFT descriptor can be computed for a log-polar location grid with three bins in radial direction (the radius set to 6, 11, and 15) and 8 in angular direction, which results in 17 location bins. The central bin may not be divided in angular directions. The gradient orientations may be quantized in 16 bins resulting in 272 bin histogram. The size of this descriptor can be reduced with PCA. The covariance matrix for PCA can be estimated on image patches collected from various images. The 128 largest eigenvectors may then be used for description.

In yet another approach, a two-object recognition algorithm may be employed to use with the limitations of current mobile devices. In contrast to the classic SIFT approach, the Features from Accelerated Segment Test (FAST) corner detector can be used for feature detection. This approach distinguishes between the off-line preparation phase where features may be created at different scale levels and the on-line phase where features may be created at a current fixed scale level of the mobile device's camera image. In one exemplary implementation, features may be created from a predetermined fixed patch size (for example 15×15 pixels) and form a SIFT descriptor with 36 dimensions. The approach can be further extended by integrating a scalable vocabulary tree in the recognition pipeline. This allows an efficient recognition of a larger number of objects on mobile devices.

According to aspects of the present disclosure, the detection and description of local image features can help in object recognition. The SIFT features can be local and based on the appearance of the object at particular interest points, and may be invariant to image scale and rotation. They may also be robust to changes in illumination, noise, and minor changes in viewpoint. In addition to these properties, the features may be highly distinctive, relatively easy to extract and allow for correct object identification with low probability of mismatch. The features can be relatively easy to match against a (large) database of local features, and generally probabilistic algorithms such as k-dimensional (k-d) trees with best-bin-first search may be used. Object descriptions by a set of SIFT features may also be robust to partial occlusion. For example, as few as 3 SIFT features from an object may be sufficient to compute its location and pose. In some implementations, recognition may be performed in quasi real time, for small databases and on modern computer hardware.

According to aspects of the present disclosure, the random sample consensus (RANSAC) technique may be employed to remove outliers caused by moving objects in view of the camera. Note that the RANSAC uses an iterative method to estimate parameters of a mathematical model from a set of observed data which contains outliers. This method can be a non-deterministic as it produces a reasonable result with an associated probability, where the probability may increase as more iteration is performed.

In one exemplary implementation, a set of observed data values, a parameterized model which can be fitted to the observations with corresponding confidence parameters. In this exemplary implementation, the method iteratively selects a random subset of the original data. These data can be hypothetical inliers and the hypothesis may then be tested as follows:

1. A model can be fitted to the hypothetical inliers, i.e. all free parameters of the model are reconstructed from the inliers.
2. All other data can then be tested against the fitted model and, if a point fits well to the estimated model; it can be considered as a hypothetical inlier.
3. The estimated model can be considered acceptable if sufficiently number of points have been classified as hypothetical inliers.
4. The model can be re-estimated from all hypothetical inliers, because it has only been estimated from the initial set of hypothetical inliers.
5. Finally, the model can be evaluated by estimating the error of the inliers relative to the model.

The above procedure can be repeated for a predetermined number of times, each time producing either a model which may be rejected because too few points are classified as inliers or a refined model together with a corresponding error measure. In the latter case, the refined model can be kept if the error is lower than the previously saved model.

In another exemplary implementation, moving objects in view of the camera can be actively identified and removed using a model based motion tracking method. In one approach, the objective of tracking can be treated as a problem of model recognition. A binary representation of the target can be tracked, and a Hausdorff distance based search can be used to search regions of the image for the object. For a binary representation of the target (a model), output from the standard canny edge detector of the Gaussian smoothed image can be augmented with the notion of a model history. At each frame, a Hausdorff search can be performed on each target, using the canny edges from the current image and the current model. In addition, an affine estimation may be performed to approximate the net background motion. From the results of these two searches, information can be gathered about the target, and be used to approximate the motion of the target, as well as separate the background from motion in the region of the target. To be able to handle hazard/unusual conditions (such as the object becoming occluded going into a shadow, the object leaving the frame, or camera image distortion providing bad image quality), history data about the target may be retained, such as the target's past motion and size change, characteristic views of the target (snapshots throughout time that provide an accurate representation of the different ways the target has been tracked), and match qualities in the past.

The history of tracking the target can be useful in more than just aiding hazard/unusual conditions; that part of a solid motion tracking method can involve history data, and not just a frame by frame method of motion comparison. This history state can provide information regarding how to decide what should be considered part of the target (e.g. things moving close to the object moving at the same speed should be incorporated into the object), and with information about motion and size, the method can predictively estimate where a lost object may have gone, or where it might reappear (which has been useful in recovering targets that leave the frame and reappear later in time).

An inherent challenge in the motion tracking method may be caused by the fact that the camera can have an arbitrary movement (as opposed to a stationary camera), which makes developing a tracking system that can handle unpredictable changes in camera motion difficult. A computationally efficient affine background estimation scheme may be used to provide information as to the motion of the camera and scene.

According to aspects of the present disclosure, an affine transformation for the image can be performed at time t to the image at time t+dt, which allows correlating the motion in the two images. This background information allows the method to synthesize an image at time t+dt from the image at time t and the affine transform that can be an approximation of the net scene motion. This synthesized image can be useful in generating new model information and removing background clutter from the model space, because a difference of the actual image at t+dt and the generated image at t+dt can be taken to remove image features from the space surrounding targets.

In addition to the use of the affine transform as a tool to clean-up the search space, it can also be used to normalize the coordinate movement of the targets: by having a vector to track how the background may be moving, and a vector to track how the target may be moving, a difference of the two vector may be taken to generate a vector that describes the motion of the target with respect to the background. This vector allows the method to predictively match where the target should be, and anticipate hazard conditions (for example looking ahead in the direction of the motion can provide clues about upcoming obstacles, as well as keeping track of where the object may be in case of a hazard condition. When an object enters a hazard condition, the method may still be able to estimate the background motion, and use that coupled with the knowledge of the model's previous movements to guess where the model may reappear, or re-enter the frame.

The background estimation can be a key factor in the prolonged tracking of objects. Note that short term tracking may be performed without background estimation, but after a period of time, object distortion and hazards may be difficult to cope with effectively without a good estimation of the background.

According to aspects of the present disclosure, one of the advantages of using the Hausdorff distance as a matching operator is that it can be quite tolerant of changes in shape during matching, but using the Hausdorff distance as a matching operator may require the objects being tracked be more accurately defined.

In one approach, straight dilation-based methods of grabbing a new model from the time t+1 image can be used. Note that in some situations where there can be non-object features close to the object (which occurs quite often), the dilation method may not be effective because it may slowly incorporate the entire scene into the model. Thus, a method of updating the model from frame to frame that can be tolerant to changes in the model shape, but not so relaxed that causing incorporating non-model pixels into the model may be adopted. One exemplary implementation is to use a combination of background removal and adding the previous models to the current model match window and taking what seems to be stable pixels, as well as the new ones surrounding them, which over time may either get eliminated from the model because they may not be stable, or get incorporated into the model. This approach can be effective in keeping the models relatively clean from clutter in the image. For example, with this approach, no longer does a road close to a truck get pulled into the model pixel by pixel. Note that the models may appear to be dilated, but this may be a result of the history effect of how the models are constructed, but it may also have the feature of making the search results more definite because this method can have more model pixels to possibly match in the next frame.

Note that at each frame, there may be a significant amount of computation to be performed. According to some implementations, the mobile device can be configured to perform smoothing/feature extraction, Hausdorff matching each target (for example one match per model), as well as affine background estimation. Each of these operations can be quite computationally expensive individually. In order to achieve real-time performance on a mobile device, the design can be configured to use as much parallelism as possible.

Note that at least the subsequent two paragraphs, FIG. 5, FIG. 6, FIG. 7 and their corresponding descriptions provide means for receiving a plurality of maps of a scene in a venue from at least one mobile device, means for identifying multiple keyframes of the plurality of maps of the scene, and means for merging the multiple keyframes to generate a global map of the scene.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause at least one processor to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of merging multiple maps for computer vision based tracking, comprising:
   receiving a plurality of maps of a scene in a venue from at least one mobile device;
   identifying multiple keyframes of the plurality of maps of the scene; and
   merging the multiple keyframes to generate a global map of the scene, wherein merging the multiple keyframes to generate the global map of the scene comprises:
   for each keyframe of the multiple keyframes,
      determining a contribution score based on angular diversity of the keyframe and scale diversity of the keyframe, and
      eliminating the keyframe in response to the contribution score being below a predetermined threshold.

2. The method of claim 1, wherein receiving a plurality of maps of a scene in a venue comprises:
   receiving the plurality of maps of the scene from multiple mobile devices.

3. The method of claim 2 further comprises:
   evaluating the multiple keyframes from the plurality of maps of the scene from multiple mobile devices for redundancy; and
   eliminating redundant keyframes.

4. The method of claim 2, further comprising:
generating a simultaneous localization and mapping (SLAM) map using the plurality of maps of the scene from multiple mobile devices; and
sharing the SLAM map among the multiple mobile devices.

5. The method of claim 1, wherein identifying the multiple keyframes of the plurality of maps of the scene comprises at least one of:
identifying the multiple keyframes representing multiple viewpoints of the scene from multiple angles; and
identifying the multiple keyframes representing multiple viewpoints of the scene with multiple scales;
wherein the multiple keyframes include common features, location coordinates, and appearances of the plurality of maps.

6. The method of claim 5, wherein multiple scales comprise at least one of:
multiple distances between the at least one mobile device and the scene; and
multiple aspect ratios of the scene from the at least one mobile device.

7. The method of claim 1, wherein determining a contribution score based on angular diversity and scale diversity of the keyframe comprises:
computing an angular diversity scoring metric by applying a first weight factor to the angular diversity of the keyframe;
computing a scale diversity scoring metric by applying a second weight factor to the scale diversity of the keyframe; and
combining the angular diversity scoring metric and the scale diversity scoring metric to generate the contribution score.

8. The method of claim 1, wherein merging the multiple keyframes to generate a global map of the scene comprises:
for each keyframe of the multiple keyframes,
determining a contribution score based on angular diversity of the keyframe; and
eliminating the keyframe in response to the contribution score being below a predetermined threshold.

9. The method of claim 1, wherein merging the multiple keyframes to generate a global map of the scene comprises:
for each keyframe of the multiple keyframes,
determining a contribution score based on scale diversity of the keyframe; and
eliminating the keyframe in response to the contribution score being below a predetermined threshold.

10. The method of claim 1, wherein merging the multiple keyframes to generate a global map of the scene comprises:
tallying the multiple keyframes in an angular histogram, wherein the angular histogram includes a plurality of bins representing different viewing angles of the scene, and each bin in the plurality of bins includes a plurality of sections representing different viewing scales of the scene;
for each keyframe of the multiple keyframes in the angular histogram,
determining a contribution score based on angular diversity of the keyframe and scale diversity of the keyframe, and
eliminating the keyframe in response to the contribution score being below a predetermined threshold.

11. The method of claim 10, wherein determining a contribution score based on angular diversity and scale diversity of the keyframe comprises:
computing an angular diversity scoring metric by applying a first weight factor to the angular diversity of the keyframe, wherein the first weight factor is based on number of keyframes in a bin the keyframe is in;
computing a scale diversity scoring metric by applying a second weight factor to the scale diversity of the keyframe, wherein the second weight factor is based on number of keyframes in a section the keyframe is in; and
combining the angular diversity scoring metric and the scale diversity scoring metric to generate the contribution score.

12. The method of claim 1 further comprises:
tracking location of the at least one mobile device in the venue.

13. An apparatus, comprising:
logic configured to receive a plurality of maps of a scene in a venue from at least one mobile device;
logic configured to identify multiple keyframes of the plurality of maps of the scene; and
logic configured to merge the multiple keyframes to generate a global map of the scene, wherein the logic configured to merge the multiple keyframes to generate the global map of the scene comprises:
for each keyframe of the multiple keyframes,
logic configured to determine a contribution score based on angular diversity of the keyframe and scale diversity of the keyframe, and
logic configured to eliminate the keyframe in response to the contribution score being below a predetermined threshold.

14. The apparatus of claim 13, wherein logic configured to receive a plurality of maps of a scene in a venue comprises:
logic configured to receive the plurality of maps of the scene from multiple mobile devices.

15. The apparatus of claim 14 further comprises:
logic configured to evaluate the multiple keyframes from the plurality of maps of the scene from multiple mobile devices for redundancy; and
logic configured to eliminate redundant keyframes.

16. The apparatus of claim 14, further comprising:
logic configured to generate a simultaneous localization and mapping (SLAM) map using the plurality of maps of the scene from multiple mobile devices; and
logic configured to share the SLAM map among the multiple mobile devices.

17. The apparatus of claim 13, wherein logic configured to identify the multiple keyframes of the plurality of maps of the scene comprises at least one of:
logic configured to identify the multiple keyframes representing multiple viewpoints of the scene from multiple angles; and
logic configured to identify the multiple keyframes representing multiple viewpoints of the scene with multiple scales;
wherein the multiple keyframes include common features, location coordinates, and appearances of the plurality of maps.

18. The apparatus of claim 17, wherein multiple scales comprise at least one of:
multiple distances between the at least one mobile device and the scene; and
multiple aspect ratios of the scene from the at least one mobile device.

19. The apparatus of claim 13, wherein logic configured to determine a contribution score based on angular diversity and scale diversity of the keyframe comprises:

logic configured to compute an angular diversity scoring metric by applying a first weight factor to the angular diversity of the keyframe;
logic configured to compute a scale diversity scoring metric by applying a second weight factor to the scale diversity of the keyframe; and
logic configured to combine the angular diversity scoring metric and the scale diversity scoring metric to generate the contribution score.

20. The apparatus of claim 13, wherein logic configured to merge the multiple keyframes to generate a global map of the scene comprises:
for each keyframe of the multiple keyframes,
logic configured to determine a contribution score based on angular diversity of the keyframe; and
logic configured to eliminate the keyframe in response to the contribution score being below a predetermined threshold.

21. The apparatus of claim 13, wherein logic configured to merge the multiple keyframes to generate a global map of the scene comprises:
for each keyframe of the multiple keyframes,
logic configured to determine a contribution score based on scale diversity of the keyframe; and
logic configured to eliminate the keyframe in response to the contribution score being below a predetermined threshold.

22. The apparatus of claim 13, wherein logic configured to merge the multiple keyframes to generate a global map of the scene comprises:
logic configured to tally the multiple keyframes in an angular histogram, wherein the angular histogram includes a plurality of bins representing different viewing angles of the scene, and each bin in the plurality of bins includes a plurality of sections representing different viewing scales of the scene;
for each keyframe of the multiple keyframes in the angular histogram,
logic configured to determine a contribution score based on angular diversity of the keyframe and scale diversity of the keyframe, and
logic configured to eliminate the keyframe in response to the contribution score being below a predetermined threshold.

23. The apparatus of claim 22, wherein logic configured to determine a contribution score based on angular diversity and scale diversity of the keyframe comprises:
logic configured to compute an angular diversity scoring metric by applying a first weight factor to the angular diversity of the keyframe, wherein the first weight factor is based on number of keyframes in a bin the keyframe is in;
logic configured to compute a scale diversity scoring metric by applying a second weight factor to the scale diversity of the keyframe, wherein the second weight factor is based on number of keyframes in a section the keyframe is in; and
logic configured to combine the angular diversity scoring metric and the scale diversity scoring metric to generate the contribution score.

24. The apparatus of claim 13 further comprises:
logic configured to track location of the at least one mobile device in the venue.

25. A computer program product comprising a non-transitory medium storing instructions for execution by one or more computer systems, the instructions comprising:
instructions for receiving a plurality of maps of a scene in a venue from at least one mobile device;
instructions for identifying multiple keyframes of the plurality of maps of the scene; and
instructions for merging the multiple keyframes to generate a global map of the scene, wherein the instructions for merging the multiple keyframes to generate the global map of the scene comprises:
for each keyframe of the multiple keyframes,
instructions for determining a contribution score based on angular diversity of the keyframe and scale diversity of the keyframe, and
instructions for eliminating the keyframe in response to the contribution score being below a predetermined threshold.

26. The computer program product of claim 25, wherein instructions for receiving a plurality of maps of a scene in a venue comprises:
instructions for receiving the plurality of maps of the scene from multiple mobile devices.

27. The computer program product of claim 26 further comprises:
instructions for evaluating the multiple keyframes from the plurality of maps of the scene from multiple mobile devices for redundancy; and
instructions for eliminating redundant keyframes.

28. The computer program product of claim 26 further comprising:
instructions for generating a simultaneous localization and mapping (SLAM) map using the plurality of maps of the scene from multiple mobile devices; and
instructions for sharing the SLAM map among the multiple mobile devices.

29. The computer program product of claim 25, wherein instructions for identifying the multiple keyframes of the plurality of maps of the scene comprises at least one of:
instructions for identifying the multiple keyframes representing multiple viewpoints of the scene from multiple angles; and
instructions for identifying the multiple keyframes representing multiple viewpoints of the scene with multiple scales;
wherein the multiple keyframes include common features, location coordinates, and appearances of the plurality of maps.

30. The computer program product of claim 25, wherein multiple scales comprise at least one of:
multiple distances between the at least one mobile device and the scene; and
multiple aspect ratios of the scene from the at least one mobile device.

31. The computer program product of claim 25, wherein instructions for determining a contribution score based on angular diversity and scale diversity of the keyframe comprises:
instructions for computing an angular diversity scoring metric by applying a first weight factor to the angular diversity of the keyframe;
instructions for computing a scale diversity scoring metric by applying a second weight factor to the scale diversity of the keyframe; and
instructions for combining the angular diversity scoring metric and the scale diversity scoring metric to generate the contribution score.

32. The computer program product of claim 25 further comprises:

instructions for tracking location of the at least one mobile device in the venue.

33. A system, comprising:

means for receiving a plurality of maps of a scene in a venue from at least one mobile device;

means for identifying multiple keyframes of the plurality of maps of the scene; and means for merging the multiple keyframes to generate a global map of the scene, wherein the means for merging the multiple keyframes to generate the global map of the scene comprises:

for each keyframe of the multiple keyframes,
- means for determining a contribution score based on angular diversity of the keyframe and scale diversity of the keyframe, and
- means for eliminating the keyframe in response to the contribution score being below a predetermined threshold.

\* \* \* \* \*